United States Patent
Grant et al.

(10) Patent No.: US 12,333,587 B2
(45) Date of Patent: Jun. 17, 2025

(54) ASSOCIATING LAND NFTs WITH DIGITAL REPRESENTATIONS OF LAND PARCELS

(71) Applicant: Deere & Company, Moline, IL (US)

(72) Inventors: Elliott Grant, Woodside, CA (US); Zhiqiang Yuan, San Jose, CA (US)

(73) Assignee: DEERE & COMPANY, Moline, IL (US)

(*) Notice: Subject to any disclaimer, the term of this patent is extended or adjusted under 35 U.S.C. 154(b) by 547 days.

(21) Appl. No.: 17/743,096

(22) Filed: May 12, 2022

(65) Prior Publication Data
US 2023/0368257 A1 Nov. 16, 2023

(51) Int. Cl.
| | |
|---|---|
| *G06Q 30/0601* | (2023.01) |
| *G06N 20/00* | (2019.01) |
| *G06Q 50/02* | (2024.01) |
| *G06Q 50/16* | (2024.01) |
| *G06V 20/10* | (2022.01) |

(52) U.S. Cl.
CPC ......... *G06Q 30/0601* (2013.01); *G06N 20/00* (2019.01); *G06Q 50/165* (2013.01); *G06V 20/10* (2022.01); *G06Q 50/02* (2013.01); *G06Q 2220/00* (2013.01)

(58) Field of Classification Search
CPC .. G06Q 30/0601; G06Q 50/165; G06Q 50/02; G06Q 2220/00; G06N 20/00; G06V 20/10; H04L 9/50; H04L 2209/56
See application file for complete search history.

(56) References Cited

U.S. PATENT DOCUMENTS

| | | | | |
|---|---|---|---|---|
| 2014/0177100 | A1* | 6/2014 | Sugiyama | G11B 5/1278 360/125.03 |
| 2016/0283887 | A1* | 9/2016 | Jagyasi | G06Q 50/02 |
| 2020/0151165 | A1* | 5/2020 | Chan | G06F 16/2379 |
| 2020/0314113 | A1* | 10/2020 | Tatge | H04L 63/0492 |
| 2020/0359550 | A1* | 11/2020 | Tran | G06Q 30/0206 |
| 2021/0117887 | A1* | 4/2021 | McGee | G06Q 10/06311 |
| 2021/0150086 | A1* | 5/2021 | Osinga | G06T 11/001 |

(Continued)

OTHER PUBLICATIONS

Bennett, Rohan, et al. "Hybrid approaches for smart contracts in land administration: Lessons from three blockchain proofs-of-concept." Land 10.2 (2021): 220. (Year: 2021).*

(Continued)

*Primary Examiner* — Corey Russ
(74) *Attorney, Agent, or Firm* — HANLEY, FLIGHT & ZIMMERMAN, LLC (57) ABSTRACT

Implementations set forth herein relate to utilizing S2 cell values to characterize arbitrary portions of land parcels and storing the S2 cell values in association with a non-fungible token (NFT) that is stored on a blockchain network, or other peer-to-peer (P2P) network. The S2 cell values can be generated by iteratively using bounding shapes that are selected to extend over at least a portion of a respective parcel of land, and each bounding shape can be represented by one or more single dimensional values. When a generated bounding shape extends outside of a boundary of a parcel of land, subcells of the bounding shape can be generated to define further bounding shapes. A land NFT for the list of cell values for the bounding shapes can be stored at a blockchain address for an authenticated owner of the parcel of land.

17 Claims, 8 Drawing Sheets

(56) References Cited

U.S. PATENT DOCUMENTS

| | | | | |
|---|---|---|---|---|
| 2022/0111960 | A1* | 4/2022 | Tran | B64D 1/18 |
| 2022/0284432 | A1* | 9/2022 | Papantoniou | H04L 63/0823 |
| 2022/0414608 | A1* | 12/2022 | Kocer | G06Q 30/0282 |
| 2023/0356091 | A1* | 11/2023 | Eisenberg | A63F 13/79 |
| 2024/0177100 | A1* | 5/2024 | Coast | G06Q 30/0185 |
| 2024/0251694 | A1* | 8/2024 | Sibley | G05D 1/43 |
| 2024/0273712 | A1* | 8/2024 | Rose | G06T 7/0012 |

OTHER PUBLICATIONS

Hariharan, Hannah Natasha, and Abarnah Kirupananda. "Chain of Ownership—A Solution to Reduce Land Forgery through a Transparent Land Ownership Portal." 2021 International Conference on Intelligent Technologies (CONIT). IEEE, 2021. (Year: 2021).*

Andrew J.M. Compton, "A Location-Aware Middleware Framework for Collaborative Visual Information Discovery and Retrieval" Air Force Institute of Technology. 767. Retrieved from https://scholar.afit.etd/767. 194 pages. Dated Aug. 14, 2017.

Victor et al., "Geofences on the Blockchain: Enabling Decentralized Location-based Services" BlockSEA 2018. The 1st Workshop on Blockchain and Sharing Economy Applications (ICDM 2018) 9 Pages.

Leal et al., "A blockchain-based service for inviolable presence registration of mobile entities" Journal of Brazillian Computer Society. https://doi.org/10.1186/s13173-021-00104-y. 15 pages. Dated 2021.

Ponlawat Weerapanpisit, "Decentralised Location-Based Reputation Management System in IoT using Blockchain" Thesis for Master of Science degree in Geospatial Technologies, 2021. Universitat Jaume. 63 pages.

Veach et al., "Spherical Geometry" S2Geometry. 7 pages.

"Creating a Digital Token of your Home, Farmland, Business . . . " Retrieved from https://etherland-news.medium.com/creating-a-digital-token-of-your-home-farmland-business-e946ea0aadd0. 4 pages. Dated Nov. 18, 2020.

* cited by examiner

ASSOCIATING LAND NFTs WITH DIGITAL REPRESENTATIONS OF LAND PARCELS

BACKGROUND

Land parcel surveying has typically been a method for determining a boundary and area of a parcel of land, and measurements performed by surveyors are often utilized to create lengthy, natural language land descriptions to be incorporated into land deeds. Although such descriptions of land have been reliably generated for centuries, such land descriptions may not be suitable for sharing land information according to a computerized protocol that has a restrictive syntax. For example, blockchain networks that enable smart contract execution typically require that all smart contracts submitted to each respective blockchain network be programmed in a particular programming language. As a result, each respective smart contract can include data that is formatted and/or otherwise arranged to comply with any syntax requirements for a particular programming language. This disparity of language between parcel descriptions in deeds and smart contract syntax can create issues when attempting—in any efficient manner—to execute smart contracts related to parcels of land (e.g., contracts for agricultural products and services).

SUMMARY

S2 cells allow the entire globe (i.e., planet Earth) to be mapped using space filling curves (i.e., bounding shapes) that cover an entire digital representation (e.g., image(s), text(s), and/or any other type(s) of data format or combination thereof) of the globe, thereby allowing any particular area on the globe to be represented as one or more cell values. Therefore, each unique location on the globe can be described by one or more datapoints, which can then be tagged with other data that can characterize features and/or a context of the respective area. Similarly, non-fungible tokens (NFTs) can refer to unique data on a blockchain network or other distributed computing network. NFTs can be associated with files such as images, audio, videos, and/or any other suitable type of file or data, and/or can also be associated with physical objects.

Implementations set forth herein relate to systems, methods, and apparatuses for associating NFTs with S2 cells for portions of land parcels throughout the entire globe. Implementations are also described herein for utilizing the NFTs for purposes such as executing and/or fulfilling "smart" contracts relating to the portions of land parcels. For example, a first user of a blockchain can have a first address on the blockchain to which certain data can be assigned and/or stored. When the first user creates and/or otherwise acquires an NFT, the NFT can be assigned to the first address, and/or any metadata associated with the NFT can point to that address. When assigning a parcel of land (i.e., a portion of real property) on the globe to the first user, a land NFT can be generated and assigned to the address associated with the first user. For example, an S2 cell can have a datapoint such as "8869040," which can refer to a parcel of land already owned by a first user. The data point can be stored in association with an NFT on a blockchain that is accessible to the first user. In some implementations, the NFT can point to metadata that is also stored on the blockchain, and/or is stored off the blockchain using a file system that the NFT can point to. For example, the NFT can be stored in association with an imaging service that provides satellite images (with prior permission from the user) of the parcel of land characterized by the S2 cell that the NFT is associated with. Images provided by the imaging service can then be utilized to verify whether certain services have been provided to the parcel of land and/or whether products are available from the parcel of land, with prior permission from the first user.

For example, the first user can issue a smart contract onto the blockchain network associated with the first address. A "smart contract" can refer to a program or other module that is stored on a blockchain network (e.g., a peer-to-peer network) and has an agreement address on the blockchain network. The smart contract can be characterized by agreement data that is issued by the first user and can be intended to solicit land services to be performed at a portion of land characterized by an S2 cell for which the first user owns the NFT. Data stored in association with the smart contract can indicate the service that the first user is soliciting from other users and/or a value that can be transferred to an address of another user in response to performing the service at the portion of land. In some implementations, another user that agrees to perform conditions in the smart contract can be issued an agreement NFT from the agreement address, and/or otherwise the smart contract can reflect that the other user has been selected to satisfy the conditions of the smart contract.

For example, a second user can have a second address on the same blockchain network as the first address of the first user. When the second user wants to be responsible for performing a service identified in the smart contract, the second user can cause a function of the smart contract to be executed and/or the second user can otherwise provide an input to the smart contract. Depending on the smart contract, an agreement NFT can, in response, be optionally generated by the smart contract program and be assigned to the address of the second user. By providing the second user with the agreement NFT, the second user can verify that they have been delegated a task of fulfilling the smart contract, and/or have the ability to solicit other users to provide a service that can result in the smart contract being fulfilled.

For example, when the second user operates to fulfill the smart contract, an exchange of value can occur such that value stored in association with the first address and/or the agreement address can be exchanged for the agreement NFT stored at the second address. In some implementations, the second user can utilize the agreement NFT to issue an additional smart contract for the services of the original smart contract to be fulfilled in exchange for a different value (e.g., a greater value) from the original smart contract. In this way, the second user can earn value by obtaining an agreement NFT for a smart contract that they feel is undervalued, and issuing an additional smart contract that solicits other users to fulfill the original smart contract at a greater value.

In some implementations, the first user can be an owner of a wheat farm, and their ownership of the parcel of farmland that includes the wheat farm can be evidenced by the first user having an S2 cell NFT that is stored in association with an S2 cell that characterizes the parcel of land. The first user can solicit other users to perform a service, such as harvesting all of the wheat on the parcel of land, by issuing a smart contract on the blockchain. The smart contract can be viewed at an application interface, and allow other users to receive an agreement NFT in response to executing a function associated with the smart contract and/or otherwise providing an input to the smart contract. For example, the smart contract can specify a function to execute for receiving the agreement NFT, and a second user can select a selectable element at an application interface to cause the agreement NFT to be transferred to a second blockchain address associated with the second user.

The second user, who is now the holder of the agreement NFT, can then either perform the services indicated by the smart contract to receive value from the first user, or offer the agreement NFT to other users for a separate value amount. The second user can be an intermediary agent that seeks to increase the value assigned to their second address by offering the agreement NFT to land service providers (e.g., other users) at a higher value than the initially indicated value. For example, an additional smart contract and an additional agreement NFT can be originated by the second user, and a third user can provide an input to an additional smart contract address to receive the additional agreement NFT. When the third user provides the service that satisfies the original smart contract (i.e., the smart contract issued by the first user), the second user address can receive value from the first user address, and the third user address can receive value from the second user address.

In some implementations, the first user can solicit other users to perform ecosystem services related to their parcel of land using smart contracts. For example, the first user can solicit other users to perform agricultural operations such as planting certain plants, rotating crops, sequestering carbon, reducing nitrogen runoff, and/or any other agricultural operation that can be performed on a parcel of land. In some implementations, the first user can setup a smart contract to receive bids from other users for performing any services specified by the smart contract and/or data stored in association with the smart contract. A second user may submit an input that earns them the ability to fulfill the smart contract and, in response to the second user submitting an accepted input, the smart contract can designate the second user as subject to the smart contract. In some implementations, the smart contract can designate the second user as subject to the smart contract by generating data that identifies the second user and that is stored in association with the smart contract. Alternatively, or additionally, the smart contract can designate the second user as subject to the smart contract by providing an agreement NFT to a second blockchain address of the second user. The smart contract can then cause the agreement NFT to be exchanged for an amount of value when the smart contract is determined to be fulfilled.

In some implementations, fulfillment of a smart contract can be determined by the first user, the second user, a third-party entity, and/or any other application or device associated with the smart contract. For example, when a first user solicits other users to fulfill a smart contract for planting tomatoes at a parcel of land owned by the first user, a third-party entity trusted by first user can be designated for verifying that the tomatoes have been subsequently planted at the parcel of land. In some implementations, the third-party entity can include one or more persons, devices, applications, and/or any other apparatus or module capable of verifying fulfillment of a condition. For example, a device that verifies performance of the smart contract can include an imaging device (e.g., a satellite, drone, security camera, etc.) that can capture a land image of the parcel of land automatically and/or in response to the second user indicating they fulfilled a condition in the contract. In some implementations, the land image can be processed using one or more heuristic processes and/or one or more trained machine learning models. For example, one or more trained machine learning models can be utilized to determine a change or a modification at the parcel of land, identify objects at the parcel of land, and/or identify objects that may have been removed from the parcel of land. When a particular change (e.g., planting of tomatoes) is determined to have occurred at first user's parcel of land, data verifying the change can be communicated to the address of the smart contract on the blockchain network. In response, the smart contract can cause the agreement NFT to be exchanged for an amount of value specified by the smart contract. For example, an amount of value stored at the contract address and/or stored at the first address of the first user can be transferred to the second address of the second user, in response to the smart contract condition being satisfied.

The above description is provided as an overview of some implementations of the present disclosure. Further description of those implementations, and other implementations, are described in more detail below.

In some implementations, a method may be implemented using one or more processors and may include: processing cell data that characterizes one or more bounding shapes that at least partially extend over a digital representation of parcels of land, wherein processing the cell data includes fractally dividing the one or more bounding shapes into a set of bounding shapes in which each bounding shape at least partially extends over a particular digital representation of a parcel of farmland, the parcel of farmland being owned by a user of a blockchain network; determining, based on processing the cell data, cell values that characterize each bounding shape, of the set of bounding shapes, that at least partially extends over the digital representation of the parcel of farmland; and generating, based on the cell values, a land non-fungible token (NFT) that is stored at a blockchain user address corresponding to the user of the blockchain network, wherein the land NFT is stored in association with the cell values that characterize each bounding shape of the set of bounding shapes that at least partially extends over the digital representation of farmland.

In various implementations, the cell values correspond to S2 cell values. In various implementations, each bounding shape of the set of bounding shapes embodies one or more Hilbert curves, and a particular cell value of the cell values corresponds to a location on one or more of the Hilbert curves.

In various implementations, the method may further include: causing a notification to be rendered at an interface of a computing device that is associated with the user, wherein the notification solicits the user to authenticate their ownership of the parcel of farmland, and wherein the land NFT is stored in association with the cell values in response to the user authenticating their ownership of the parcel of farmland.

In various implementations, the method may further include: determining that the user of the blockchain network has provided, to the blockchain network, blockchain agreement data that identifies a value to exchange for satisfying a condition at a portion of the parcel of farmland, wherein satisfying the condition includes performing an agricultural operation at the portion of the parcel of farmland, and wherein the blockchain agreement data is stored at a blockchain agreement address of the blockchain network with other cell values that correspond to a subset of bounding shapes that at least partially extends over another digital representation of the portion of the parcel of farmland.

In various implementations, the method may further include: determining that an additional user of the blockchain network has caused an agreement input to be communicated from an additional blockchain user address to the blockchain agreement address, wherein the additional blockchain user address is stored on the blockchain network in association with the additional user.

In various implementations, the method may further include: determining, in response to the agreement input being communicated from the additional blockchain user address to the blockchain agreement address, whether the agricultural operation has been performed at the portion of the parcel of farmland; and when the agricultural operation has been performed at the portion of the parcel of farmland: causing, based on determining that the condition is satisfied, updated property data to be stored in association with the land NFT, and the value to be transferred from the blockchain agreement address, or the blockchain user address, to the additional blockchain user address, wherein the updated property data indicates a modification to the portion of the parcel of farmland resulting from performance of the agricultural operation at the portion of the parcel of farmland.

In another aspect, a method implemented by one or more processors may include: determining a cell value for a parcel of land that is associated with a first user of a blockchain network, wherein the cell value defines at least a boundary of the parcel of land, and the blockchain network is a peer-to-peer network of multiple different devices; generating, based on the cell value, a land non-fungible token (NFT) that includes NFT data that correlates the cell value for the parcel of land to a first blockchain address on the blockchain network, wherein the land NFT is stored on one or more devices of the multiple different devices of the blockchain network, and the first blockchain address is stored in association with the first user; determining, subsequent to generating the land NFT, that the first user has provided blockchain agreement data that identifies a value to exchange for satisfying a condition at the parcel of land, wherein satisfying the condition includes performing an agricultural operation at the parcel of land; generating, based on the blockchain agreement data, a blockchain agreement address that is stored on the blockchain network in association with the land NFT, wherein the blockchain agreement data is stored at the blockchain agreement address and the blockchain agreement data is accessible to one or more other users of the blockchain network; determining, subsequent to generating the blockchain agreement address, that a second user of the blockchain network has caused an agreement input to be transferred from a second blockchain address to the blockchain agreement address, wherein the second blockchain address is stored on the blockchain network in association with the second user; and causing, in response to the agreement input being transferred from the second blockchain address to the blockchain agreement address, an agreement NFT to be transferred from the blockchain agreement address to the second blockchain address for the second user, wherein the agreement NFT indicates that the second user has been selected to perform the agricultural operation at the parcel of land.

In various implementations, determining the cell value for the parcel of land that is associated with the first user of a blockchain network includes: determining a parcel of land address for the first user; and selecting, based on the parcel of land address, a single-dimensional value for the parcel of land from a finite range of values corresponding to various different portions of a parcel of land, wherein the cell value includes the single-dimensional value.

In various implementations, determining the cell value for the parcel of land that is associated with the first user of the blockchain network includes: determining a parcel of land address for the first user; and selecting, based on the parcel of land address, an S2 cell value for the parcel of land, wherein the cell value includes the S2 cell value.

In various implementations, the agricultural operation includes adding an object to the parcel of land, removing another object from the parcel of land, and/or modifying a particular object at the parcel of land.

In various implementations, the method may further include determining, subsequent to the agreement NFT being transferred from the blockchain agreement address to the second blockchain address for the second user, whether a data source indicates that the condition identified by the blockchain agreement data has been satisfied. In various implementations, determining whether the data source indicates that the condition identified by the blockchain agreement data has been satisfied includes: processing image data using one or more trained machine learning models in furtherance of determining whether the agricultural operation has been performed at the parcel of land.

In various implementations, the data source is a computing device that includes one or more sensors that are responsive to environmental changes at the parcel of land, and determining whether the data source indicates that the condition identified by the blockchain agreement data has been satisfied includes: receiving, at the blockchain agreement address, environmental data that is based on sensor data generated using the one or more sensors of the computing device. In various implementations, the one or more sensors include a moisture sensor, a temperature sensor, an image sensor, and/or a weight sensor.

In various implementations, determining the cell value for the parcel of land that is associated with the first user of the blockchain network includes: determining the cell value using an S2 cell that corresponds to a collection of parcels of land, wherein the collection of parcels of land includes the parcel of land and other parcels of land.

In yet another aspect, method implemented by one or more processors may include: determining that a first user of a blockchain network has provided, to the blockchain network, blockchain agreement data that identifies a value to exchange for satisfying a condition at a parcel of land associated with the first user, wherein satisfying the condition includes performing an agricultural operation at the parcel of land, and wherein the parcel of land is characterized by a land NFT that is stored, by the blockchain network, at a first blockchain address associated with the first user; determining that a second user of the blockchain network has caused an agreement input to be communicated from a second blockchain address to a blockchain agreement address, wherein the second blockchain address is stored on the blockchain network in association with the second user, and the blockchain agreement address is stored on the blockchain network in association with the blockchain agreement data; determining, in response to the agreement input being communicated from the second blockchain address to the blockchain agreement address, whether the agricultural operation has been performed at the parcel of land; and when the agricultural operation has been performed at the parcel of land to satisfy the condition identified by the blockchain agreement data: causing, based on determining that the condition is satisfied, updated property data to be stored in association with the land NFT, and the value to be transferred from the blockchain agreement address, or the first blockchain address, to the second blockchain address, wherein the updated property data indicates a modification to the parcel of land resulting from performance of the agricultural operation at the parcel of land.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

FIG. 1A, FIG. 1B, FIG. 1C, FIG. 1D, and FIG. 1E illustrate a view 100, a view 120, a view 130, a view 140, and a view 150 of identifying and fractally dividing cells rendered over a representation of a land parcel 106 to generate values that can define the land parcel 106. "Fractally dividing" can refer to, but is not limited to, resizing and/or scaling a bounding shape, to fit into a smaller area of that bounding shape, in a recursive manner until a desired resolution and/or scale is achieved. An S2 cell 110 can refer to a portion of bounding shape (e.g., a shape that includes one or more lines and/or curves) that can be rendered over an entire globe 102 (e.g., planet Earth), thereby allowing any portion of land on the globe 102 to be represented by one or more instances of single-dimensional data (e.g., multiple instances of single-dimensional data can include a list of cell values). For example, a parcel of land 106 (e.g., a parcel of farmland) can be characterized by the S2 cell curve 110, which can fill an area 108 (e.g., a square, trapezoid, polygon, etc.) of a digital representation of at least a portion of the parcel of land 106. The S2 cell curve 110 can characterize a sub-cell of a globe cell 104 that surrounds entire boundaries of a collection of land parcels. In some implementations, the S2 cell curve 110 can have a cell value selected from a range of values, starting at a first value 112 and ending at a second value 114, for a digital bounding shape and/or line that at least partially extends over a digital representation of the area 108 corresponding to the parcel of land 106. A line filling the area 108 can be, for example, a space filling curve such as one or more Hilbert curves, and/or any other space filling curve that can be rendered to fill a space, as a single line. However, in some implementations, the area 108 of the parcel of land 106 can be characterized by one or more other values, having one or more dimensions, for indicating a location, a boundary, a relative area, and/or a size of the land parcel 106.

In some implementations, any arbitrary field can be described by an agglomeration of S2 cells, and those S2 cells can be embodied in, and/or stored in association with, a land NFT that is stored at a land owner's blockchain address on a blockchain network. For example, the portion of land 116 can be part of a land parcel 106 owned by a first user 206 depicted in FIG. 2A. The land parcel 106 can be stored as digital map data that characterizes property lines and/or property boundaries. The land parcel 106 can be particularly characterized by multiple different S2 cell values by selecting a first cell 118 that corresponds to one or more bounding shapes with a perimeter that entirely surrounds the land parcel 106. Cell data characterizing the first cell 118 (i.e., bounding shape) can then be processed to identify second cells 122, and the second cells 122 that extend over the digital representation of the land parcel 106 and/or a boundary of the digital representation of the land parcel 106 can be identified, as illustrated in FIG. 1B.

Figure 1A:
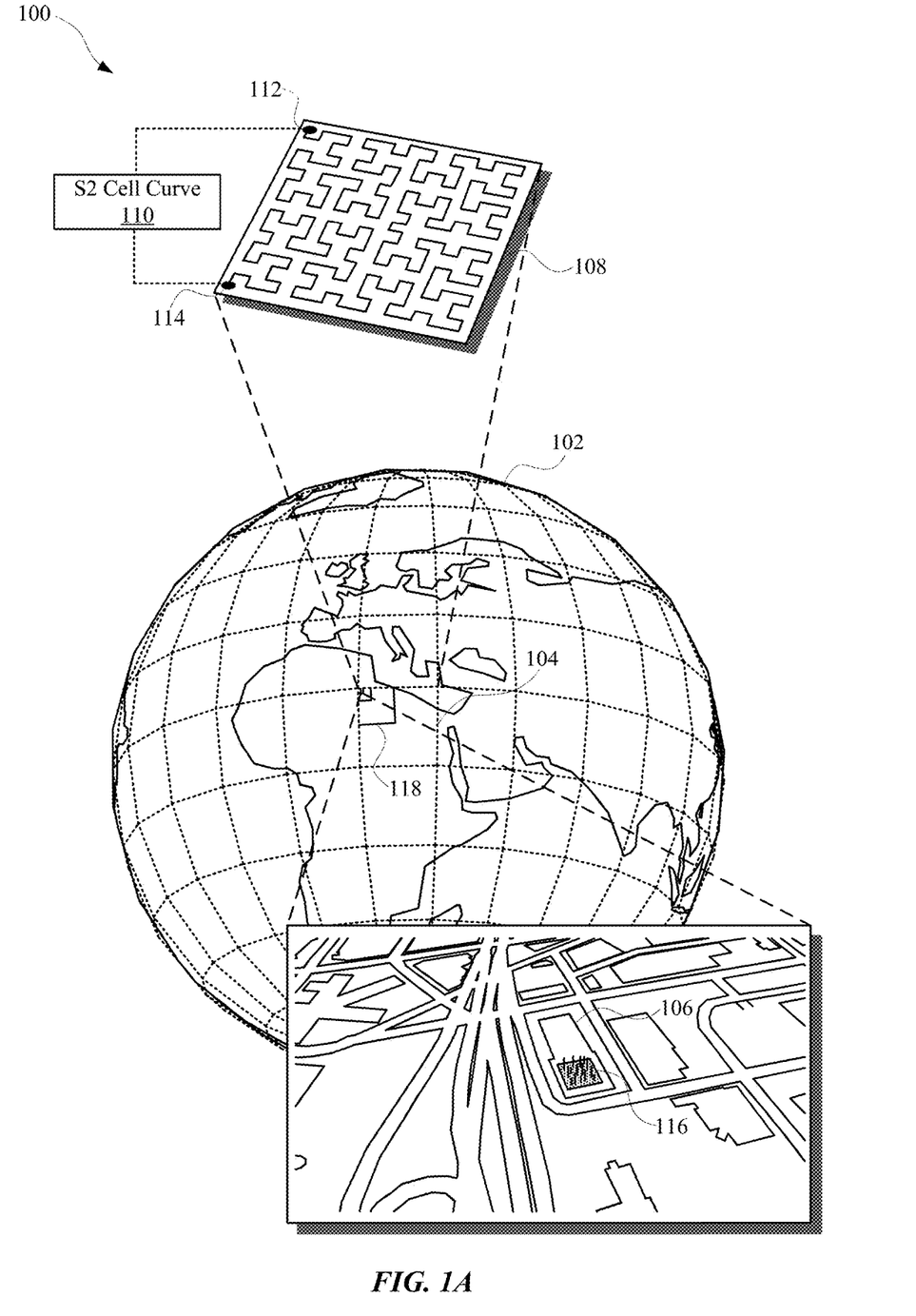
FIG. 1A, FIG. 1B, FIG. 1C, FIG. 1D, and FIG. 1E illustrate views of identifying and fractally dividing cells rendered over a representation of parcels of land to generate values that can define a particular land parcel.
Figure 1B:
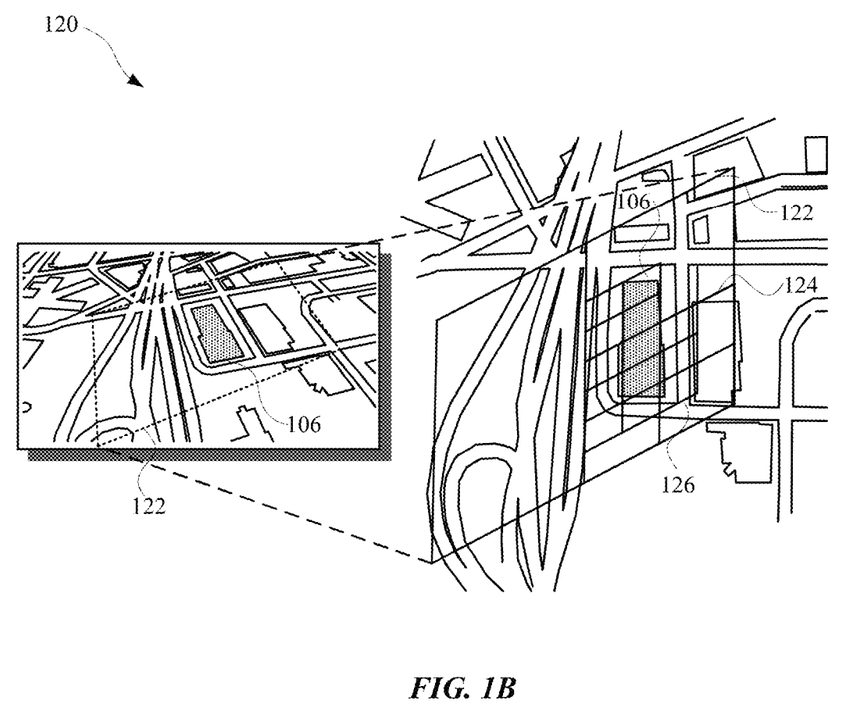

Each of the second cells 122 that at least partially extend over the land parcel 106 can be fractally divided into third cells 124, and fourth cells 126, as illustrated in view 120 of FIG. 1B. Depending on a granularity and/or resolution desired by users of a blockchain network, the S2 cells can continue to be selected and fractally divided, in a recursive manner until a certain level of granularity and/or resolution is achieved. For example, fifth cells 132 illustrated in view 130 of FIG. 1C can be generated by processing cell data characterizing the fourth cells 126, when the fourth cells 126 are determined to at least overlap a particular area within an outermost boundary of the land parcel 106 and optionally another particular area or other part of the land parcel 106. Any resulting fifth cells 132 that also overlap the outermost boundary of the land parcel 106 can then be selected for further subdividing. An additional bounding shape, such as that of the subdivided fifth cells 132 overlapping the representation of the outermost boundary of the land parcel 106, can then be subdivided into sixth cells 142, as illustrated in view 140 of FIG. 1D, and then further subdivided into seventh cells 152, as illustrated in view 150 of FIG. 1E, according to whether the sixth cells 142 overlap the outermost boundary of the land parcel 106.

Each cell can be a shape in which one or more S2 cells 110 can fit, in furtherance of defining a parcel of land according to values for the S2 cells. For example, a cell value for a globe cell 104 and/or a cell that defines a boundary over a portion of a digital representation of the globe 102 can be selected (e.g., a first cell value of "5" or other single-dimensional value), from a finite range of values, based on the boundary for the globe cell 104 completely surrounding an outermost boundary of the land parcel 106. A first cell 118 included within the globe cell 104 can then be selected (e.g., a second cell value of "0") for defining a location within the globe cell 104 that includes the land parcel 106. In some implementations, a value (e.g., "50") for this additional cell can include a reference to the globe cell (e.g., "5") and a reference to the first cell 118 (e.g., "0"). In order to achieve further granularity, the first cell 118 can be fractally divided into a number of cells, and a second cell 122 that includes the land parcel 106 can be selected, as illustrated in FIG. 1B.

View 120 of FIG. 1B illustrates how a cell can be rendered over a computerized map or other representation of various different parcels of land. The second cell 122 can be fractally divided into third cells 124 (e.g., a quarter of the second cell 122 as illustrated in FIG. 1B), and each third cell 124 that includes the land parcel 106 can have a distinct value. For example, the third cell 124 at the top right of the second cell 122 can correspond to a value "501," (e.g., where "1" is a third cell value) and the third cell 124 at the bottom right of the second cell 122 can correspond to a value "502." Alternatively, or additionally, the cell value corresponding to each cell can be based on an arrangement of a curve of an S2 cell within each particular cell.

For example, one or more processors processing cell data and fractally dividing the curve illustrated in the S2 cell 110 of FIG. 1A can select a location value between the first value 112 and the second value 114 for rendering another, smaller cell. In some implementations, the value "0" after the globe cell 104 can refer to the first value 112 for a particular cell curve, the value "025" can refer to a location that is one-quarter the length of the particular cell curve from the first value 112, the value "050" can refer to a location that is one-half the length of the particular cell curve from the first value 112, the value "075" can refer to a location that is three-quarter the length of the particular cell curve from the first value 112, and the value "100" can refer to the second value 114 for the particular cell curve. In this example, any additional subcells and/or bounding shapes resulting from subdividing a larger cell can then have a value that is prefaced with the value (e.g., "5075") of a cell that includes a respective subcell. Alternatively, or additionally, as smaller subcells are selected, those subcells may not need to be fractally divided when those subcells have boundaries that are completely surrounded by an outer boundary of the land parcel 106. However, when other smaller subcells are selected, those other subcells may need to be fractally divided when those other subcells have boundaries that are not completely surrounded by the outermost boundary of the land parcel 106.

Figure 1C:
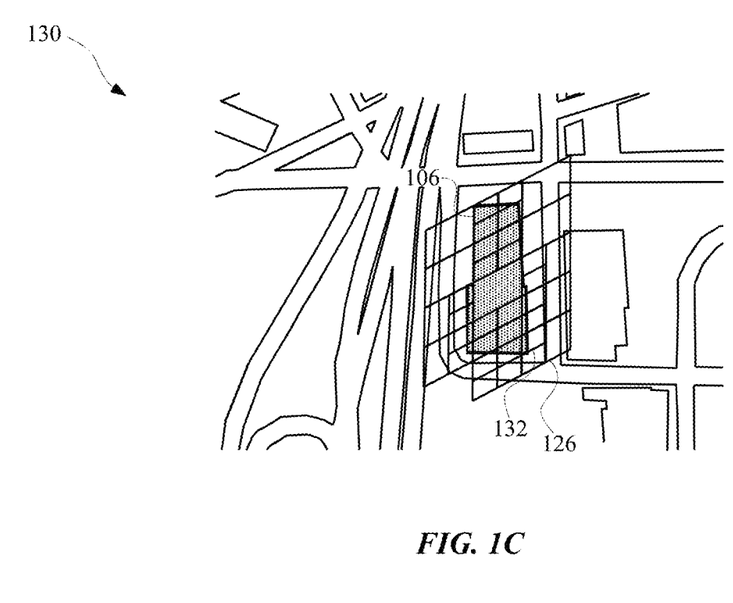
Figure 1D:
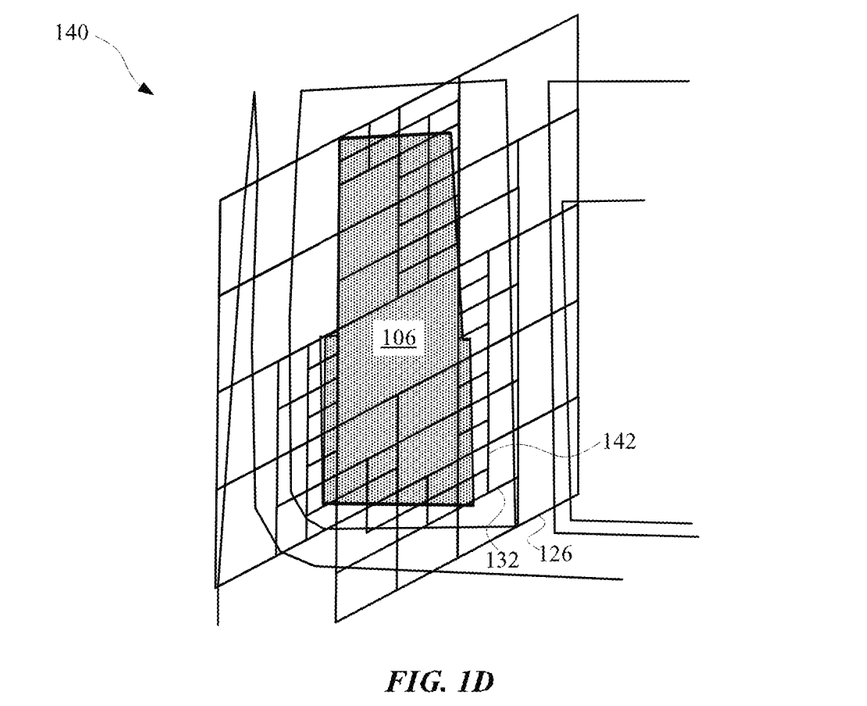
Figure 1E:
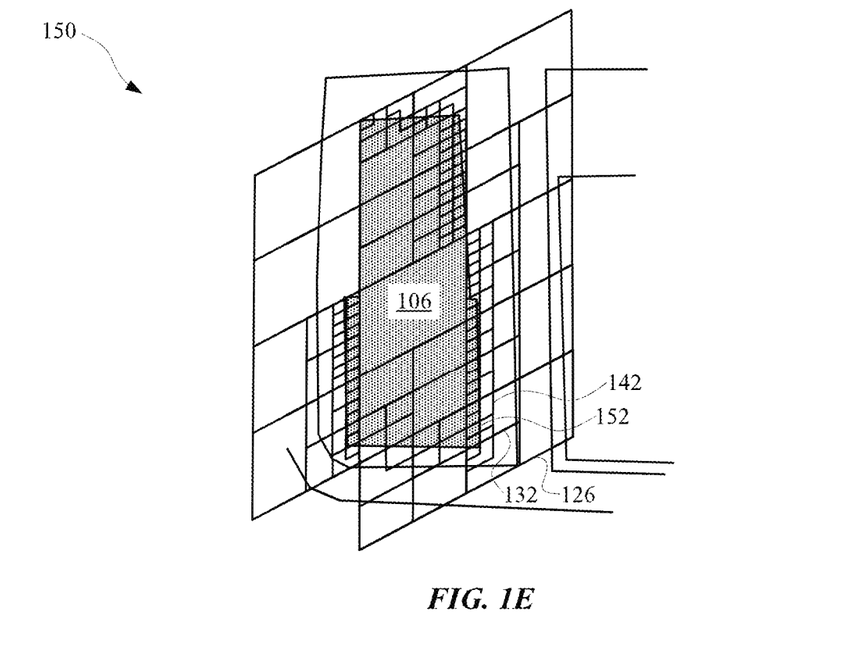

For example, certain fourth cells 126 can overlap the land parcel 106 boundary, and also overlap other nearby parcels of land, therefore these certain fourth cells 126 can be fractally divided into fifth cells 132, as illustrated in FIG. 1C. Each additional subcell that at least partially overlaps the parcel of land can have a corresponding value that is stored in association with, and/or embodied in, an NFT of a blockchain network. For example, a list of S2 cell values (e.g., "50753," "507344", "507345," etc.) can be stored in association with an NFT, and each cell value in the list of cell values can correspond to a subcell that at least partially overlaps, and/or completely overlaps, a digital representation of the land parcel 106. Depending on the desired resolution and/or granularity, the list of cell values can be extended to include sixth cells 142, seventh cells 152, and so forth, as illustrated in FIG. 1D and FIG. 1E. When a user wants to solicit one or more operations to be performed at a portion of land 116 (e.g., a portion or parcel of farmland), the user can interact with an application that interfaces with the blockchain network to generate cell values that define the portion of land 116. For example, and as illustrated in FIG. 1A and FIG. 2B, the land parcel 106 can include a portion of land 116 that may require some amount of maintenance that a user would like to solicit other blockchain users to perform. The user can cause a portion of the list of cells and subcells that define the land parcel 106 to be embodied in, and/or otherwise stored in association with a smart contract. In this way, other users and/or devices that interact with the blockchain network can have an objective and immutable definition for the portion of land 116 that is the subject of the smart contract. In some implementations, the user can be solicited by an application executing on the blockchain network to authenticate themselves as the owner of the portion of land 116. For example, the application can access a particular land parcel address that may correspond to the user, and the user can submit data to the application to authenticate their ownership of the particular address and/or the portion of land 116.

Figure 2A:
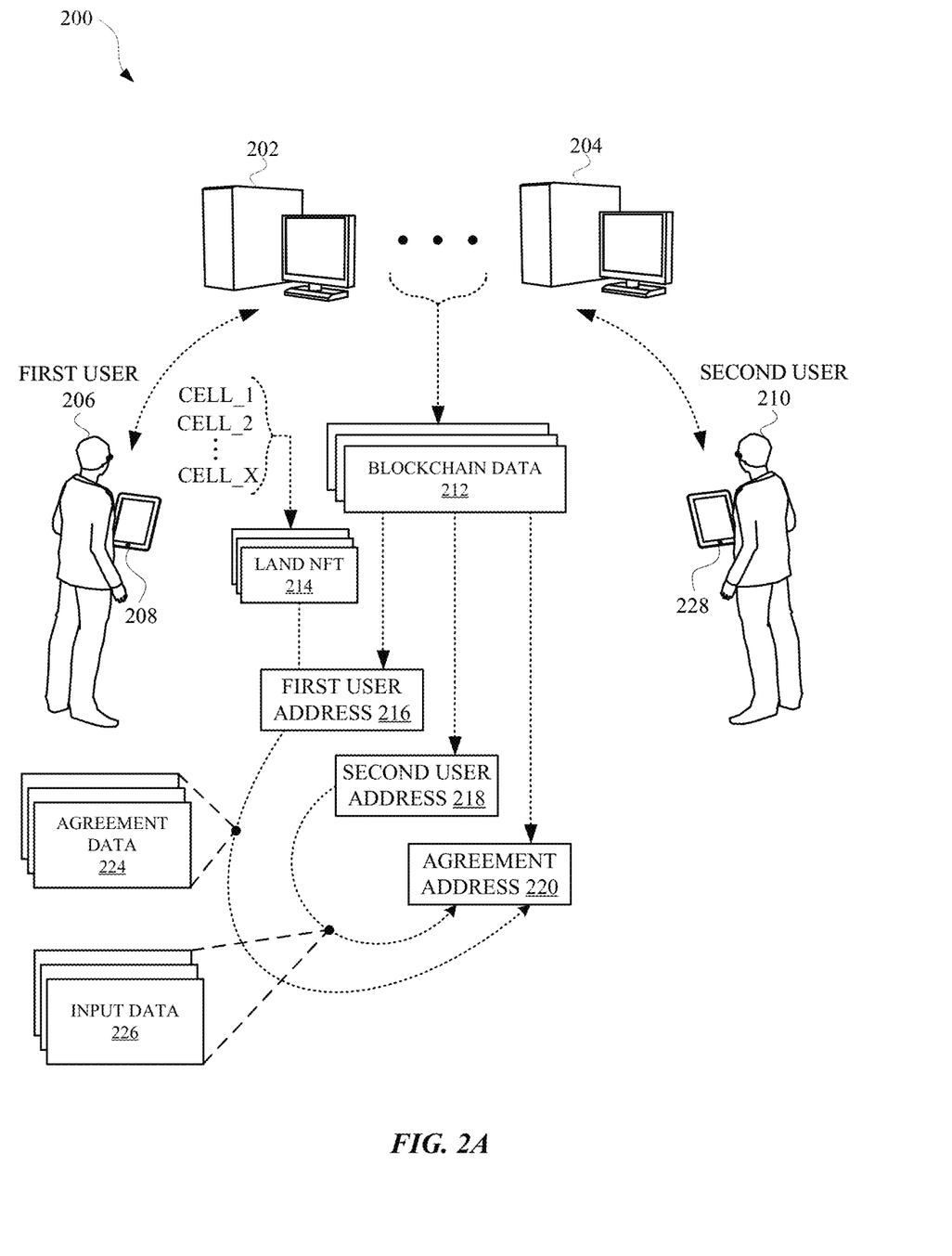
FIG. 2A, FIG. 2B, and FIG. 2C illustrate views of a first user initializing a smart contract for agricultural operations to be performed on their land, which is defined by a land NFT stored on a blockchain network.
Figure 2B:
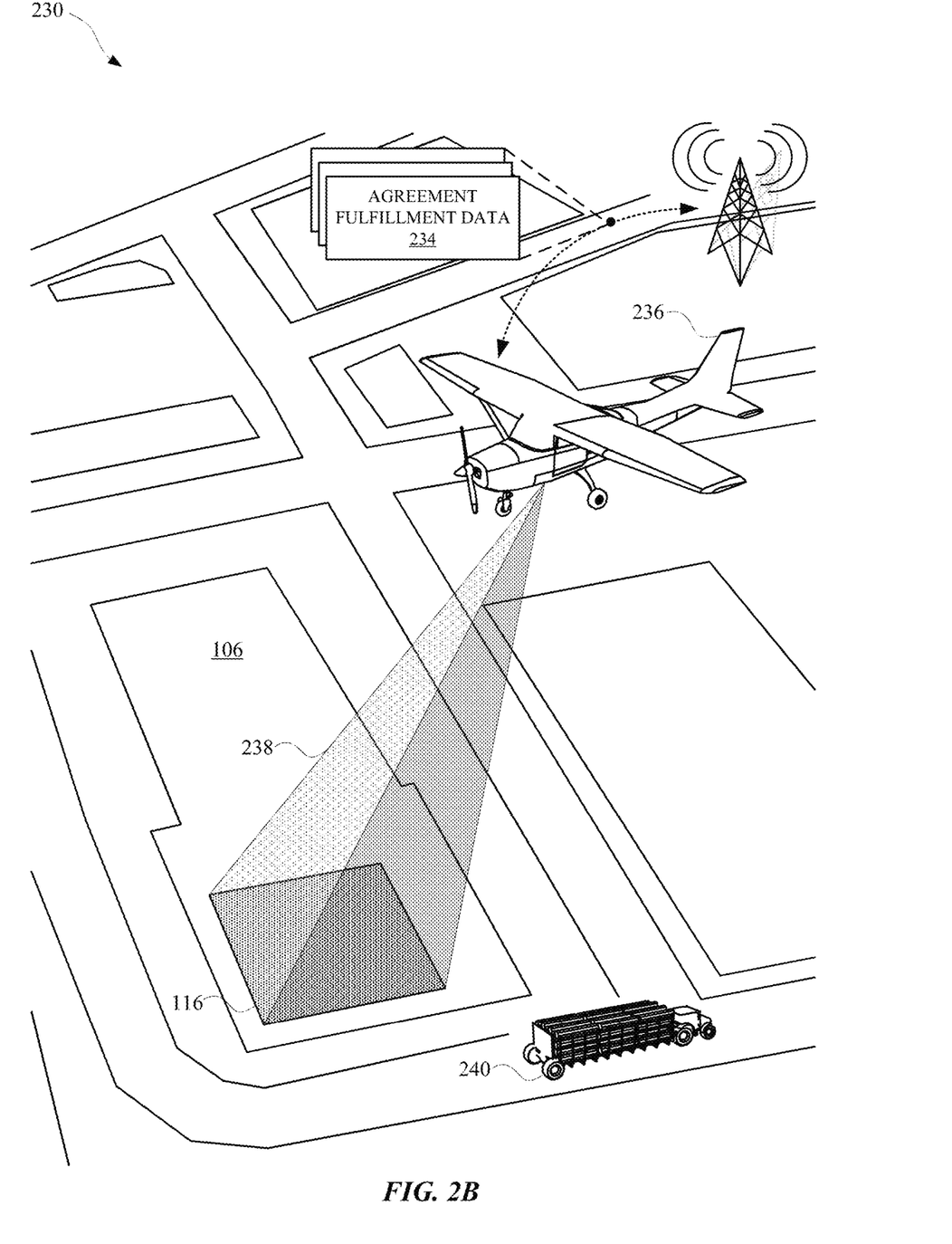
Figure 2C:
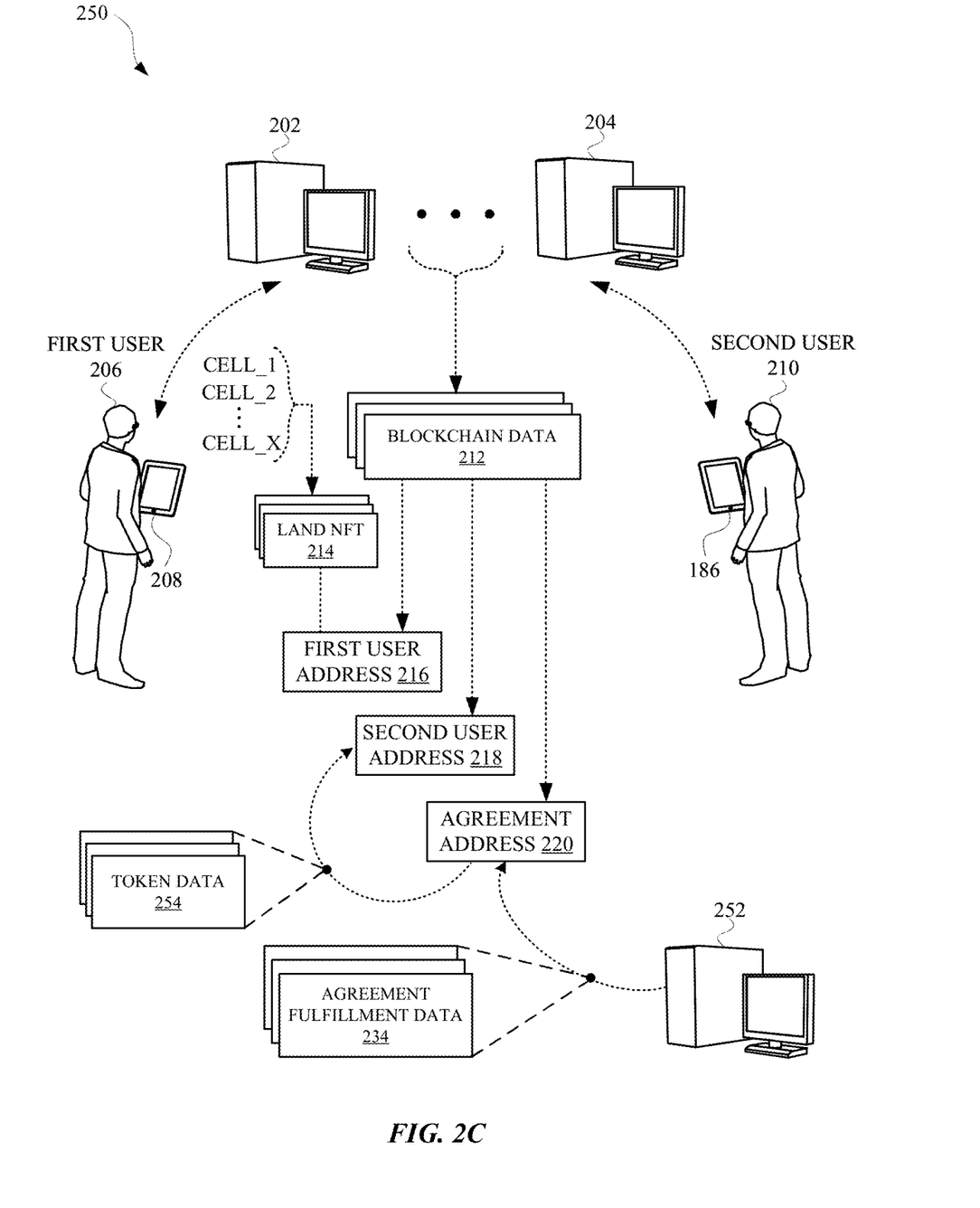

For example, a first user 206 of a blockchain network, as illustrated in FIG. 2A, can be assigned a first user address 216 that is stored with blockchain data 212 that can be distributed across a peer-to-peer (P2P) network of multiple different devices (e.g., a first computing device 202, a second computing device 204, etc.). In some implementations, the blockchain network can be a directed acyclic graph (DAG) network and/or other type of distributed computing network that can be accessible to various different users and/or execute smart contracts. The first user 206 can claim the parcel of land 106 as their own by undertaking an authentication process (e.g., having the user access mail sent, by a third party entity, to an address for an owner identified by a city's property valuation administration) for verifying that the parcel of land 106 and/or corresponding property address is owned by the first user 206, and/or that the first user 206 is a verified agent of an owner of the parcel of land 106. When the first user 206 is verified as the owner of the parcel of land 106, a land NFT 214 can be generated and stored at the first user address 216, thereby indicating the first user 206 is the only user on the blockchain network that owns the parcel of land 106. In some implementations, the land NFT 214 can embody and/or be stored in association with one or more S2 cell values (e.g., a list of multiple different single-dimensional values) "CELL_1," "CELL_2," . . . "CELL_X" for the land parcel 106, as discussed at least with respect FIG. 1A-1E. For example, data source can be voted, by multiple different blockchain users, as a trusted source (e.g., network-connect sensors) for providing data that indicates whether certain types of conditions (e.g., conditions related to agricultural operations) have been satisfied. Additionally, a data source for indicating S2 cell values can also be designated as a trusted source for S2 cell values, and any land NFT on the blockchain network can reference and/or otherwise point to the trusted data source for S2 cell values.

In some implementations, the first user 206 can access a first computing device 208 to generate agreement data 224 that can characterize a smart contract (i.e., a blockchain agreement program) that can execute on the blockchain network. The smart contract can be programmed such that, when one or more conditions are determined to be satisfied, a transfer of value can be initialized from an agreement address 220, corresponding to the smart contract, to another user that has caused the one or more conditions to be satisfied. In some implementations, the smart contract can identify an agricultural operation that can be performed to fulfill a condition of the smart contract. When the first user 206 causes the agreement data 224 to be available to the blockchain network, other users can provide inputs to the agreement address 220, in furtherance of being selected for, and/or automatically designated for, fulfilling the smart contract. For example, a second user 210 can operate a second computing device 228 to access the blockchain network. The second user 210 can be assigned a second user address 218, from which the second user 210 can submit, via their second computing device 228 input data 226 (i.e., an agreement input) to the agreement address 220. The input data 226 can indicate a willingness of the second user 210 to perform agricultural operations in furtherance of satisfying one or more conditions of the smart contract. In some implementations, the second user 210 can submit an NFT to the agreement address 220, thereby indicating that the second user 210 would like to be considered as a candidate for receiving the benefit of the smart contract. In some implementations, one or more users can be selected, in response to the smart contract receiving certain input from the one or more users, to satisfy the conditions of the smart contract automatically. For example, in response to the second user 210 causing a particular function of the smart contract to be executed, the second user 210 can be automatically tasked with fulfilling the conditions of the smart contract.

In some implementations, the smart contract can include one or more conditions that may necessitate the second user 210 cause certain agricultural operations be performed at the portion of land 116. For example, the agricultural operations can include removing certain objects (e.g., plants), adding particular objects, reducing a percentage of certain materials (e.g., reducing nitrogen runoff), increasing a percentage of certain materials (e.g., increasing carbon sequestration), modifying certain plants and/or a particular object or objects on the land (e.g., constructing a greenhouse and/or moving a greenhouse), and/or any other operation that can be performed on a parcel of land. For example, the smart contract can include a condition that bamboo must be removed from the portion of land 116 in order for a condition of the smart contract to be satisfied and for value to be transferred from the agreement address 220 to the second user address 218. In some implementations, a third party (relative to the first user 206 and the second user 210) can be tasked with providing data that can be utilized to objectively determine whether the condition has been fulfilled. For example, and as illustrated in FIG. 1C, a third-party device 236 (e.g., third party relative to the first user 206 and the second user 210) can be connected to the blockchain network and provide agreement fulfillment data 234 associated with the portion of land 116 owned by the first user 206, with prior permission from the first user 206. In some implementations, the third-party device 236 can use one or more sensors (e.g., a moisture sensor, a temperature sensor, an image sensor, and/or a weight sensor) to perform a detection 238 of changes occurring at the portion of land 116 over time. For example, satellite images can be utilized with prior permission from a user to determine a pattern of movement of agricultural products (e.g., vegetables and/or seeds) to and/or from the portion of land 116, and/or a pattern of movement of agricultural equipment at the portion of land 116.

The agreement fulfillment data 234 can be processed by one or more devices connected to the blockchain network, and/or preprocessed by a third-party entity prior to the blockchain network receiving the agreement fulfillment data 234. For example, when the agreement fulfillment data 234 includes image data, one or more trained machine learning models can be utilized when processing the image data to determine whether bamboo that once existed at the portion of land 116 is no longer there. For example, FIG. 1A can depict the portion of land 116 having the bamboo, and FIG. 2B can depict the portion of land 116 no longer having the bamboo as a result of an agent 240 of the second user 210 removing the bamboo. When the agreement fulfillment data 234 indicates that the bamboo has been removed, per the condition of the smart contract, the agreement fulfillment data 234 and/or other processed data can be provided by the third-party device 236 and/or another computing device 252 to the agreement address 220. The smart contract can then perform a function that confirms whether the agreement fulfillment data 234 was provided by a trusted source and/or whether the agreement fulfillment data 234 satisfies the condition of the smart contract. In response, token data 254 can be communicated via the blockchain network from the agreement address 220 to the second user address 218.

Figure 3:
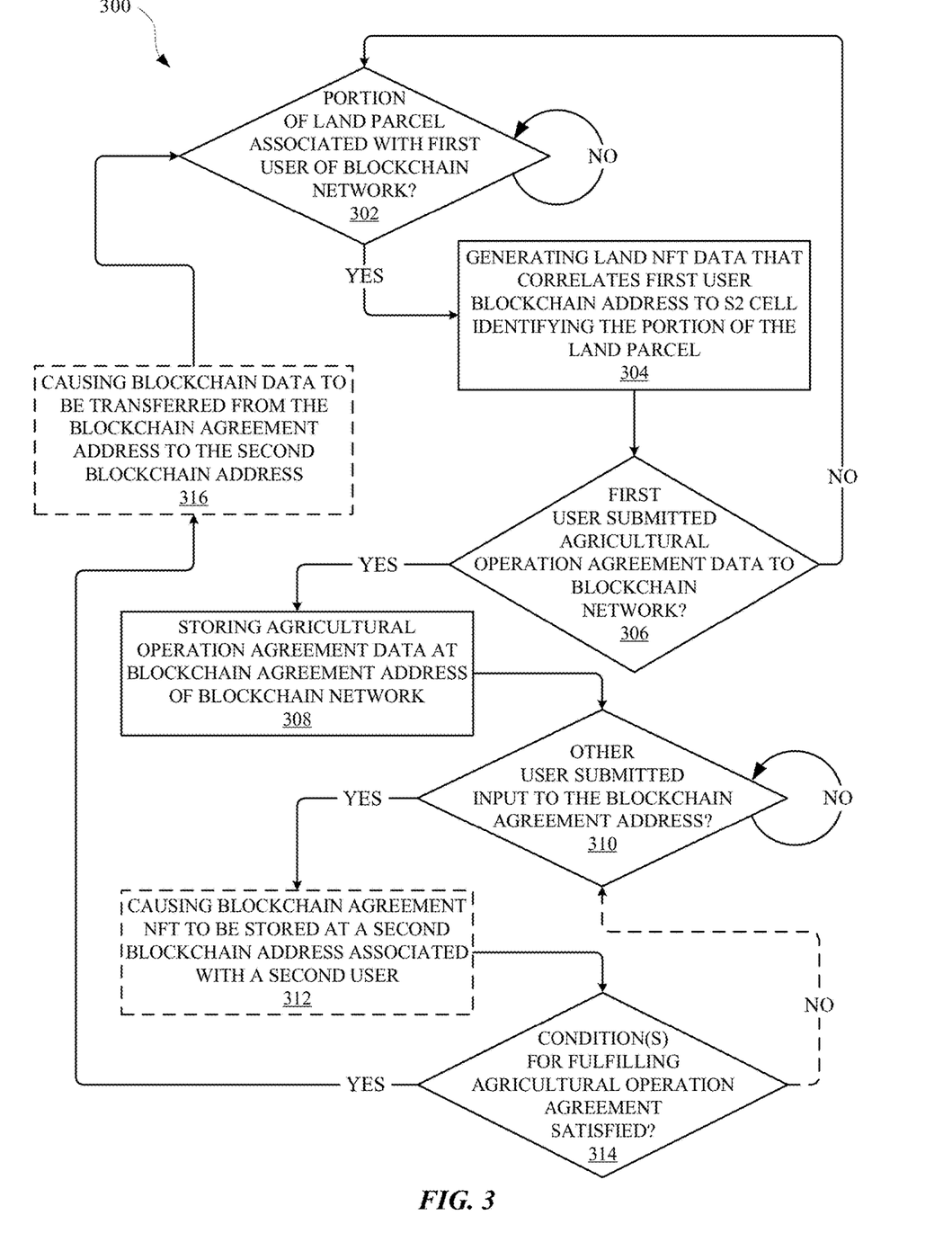
FIG. 3 illustrates a method for providing a land NFT for an S2 cell of a parcel of land owned by a user and facilitating smart contracts related to operations performed at the parcel of land.

FIG. 3 illustrates a method 300 for providing a land NFT for a parcel of land owned by a user and facilitating smart contracts related to operations performed at the parcel of land. The method 300 can be performed by one or more computing devices, applications, and/or any other apparatus or module that can be associated with a network of devices. The method 300 can include an operation 302 of determining whether a parcel of land is associated with a first user of a blockchain network. In some implementations, an index of land parcels can be available with information that correlates various parcels of land to their respective owners. Users of the blockchain network can then receive a notification that solicits the user to submit information, which can be compared to the index of land parcels, to securely authenticate their ownership of certain parcels of the land. When, for example, a first user is determined to be the owner of a parcel of land, the method 300 can proceed from the operation 302 to an operation 304.

The operation 304 can include generating a land NFT data that is stored in association with the first user and an identifier for the parcel of land owned by the first user. In some implementations, the identifier for the parcel of land can be one or more S2 cell values, which can describe S2 cells (e.g., bounding shapes) that can be rendered to extend over various different areas of a parcel of land. For example, S2 cells can correspond to single dimensional data that characterizes all land on the globe (i.e., planet Earth) and a portion of the S2 cell—as well as a parcel of land on the globe—can be represented by an S2 cell value. In some implementations, the land NFT can be assigned to a first blockchain address of the first user, and the land NFT can embody and/or otherwise reference a list of S2 cell values for the parcel of land owned by the first user. The land NFT can also embody and/or otherwise be stored in association with information that characterizes features of the parcel of land owned by the first user. For example, the land NFT can be stored in association with a data source that provides updated images and/or other sensor data from the parcel of land, with prior permission from the first user. In some implementations, the data source can be stored on the blockchain and/or otherwise linked to the blockchain network through an address on the blockchain network. For example, satellite images captured by a third-party entity can be stored in a database that can be accessed via a third party blockchain address of the blockchain network.

The method 300 can proceed from the operation 304 to an operation 306, which can include determining whether the first user has submitted operation agreement data to the blockchain network. The operation agreement data can characterize a smart contract which can be an application and/or module that executes on the blockchain network and is stored at a blockchain agreement address on the blockchain network. The smart contract can solicit one or more other users of the blockchain network to bid on a particular service that the first user wants to have performed at their parcel of land. For example, the smart contract can indicate one or more conditions that should be satisfied to fulfill the smart contract, and an amount of value that can be exchanged in response to the one or more conditions being satisfied. In some implementations, a condition of the smart contract can identify an agricultural operation that can be performed on the parcel of land, and/or a section of the parcel of land owned by the first user. For example, the smart contract can specify that a garden occupying a section of their parcel of land should receive mulch in order for a smart contract condition to be fulfilled, and the garden can be characterized by a list of S2 cell values. Alternatively, or additionally, the smart contract can identify a data source that will be utilized to verify the performance of the agricultural operation that fulfills the condition. For example, the data source can be a third party entity and/or device that can detect changes to the section of the parcel of land (e.g., the garden) and objectively determine (e.g., using one or more trained machine learning models) whether the agricultural operation was performed at the section of the parcel of land.

When the first user submits the agricultural operation agreement data to the blockchain network, the method 300 can proceed from the operation 306 to an operation 308. Otherwise, the method 300 can return to the operation 302 and/or another suitable operation. The operation 308 can include storing agricultural operation agreement data at a blockchain agreement address of the blockchain network. In some implementations, the blockchain agreement address can allow users of the blockchain network to send to and/or receive from the blockchain agreement address value and/or data. For example, the first user can cause an amount of value to be transferred from the first blockchain address of the first user to the blockchain agreement address. In this way, when the condition(s) of the blockchain network is completed, the value stored at the blockchain agreement address can be transferred to a user who caused the condition(s) to be fulfilled.

The method 300 can proceed from the operation 308 to an operation 310 of determining whether another user submitted input to the blockchain agreement address, and/or the first blockchain address of the first user, in furtherance of being selected to fulfill the conditions of the smart contract. In some implementations, a second user can submit a bid, a value, an NFT, and/or other input to the blockchain agreement address in furtherance of being selected to fulfill the smart contract. For example, the second user can submit an input to the blockchain agreement address via a distributed application that executes on the blockchain network, and/or a client application that is connected to the blockchain network. When the blockchain agreement address receives the input, the method 300 can proceed from the operation 310 to an optional operation 312. Otherwise, the smart contract can wait for input from a user of the blockchain network and/or the method 300 can proceed from the operation 310 to another suitable operation.

The optional operation 312 can include causing a blockchain agreement NFT to be stored at a second blockchain address associated with the second user. The blockchain agreement NFT can be generated by the smart contract program and can optionally indicate that the second user has been selected to perform the conditions characterized by the agricultural operation agreement data (i.e., the smart contract). In this way, because the blockchain agreement NFT is non-fungible, the second user will be guaranteed to receive the value indicated by the smart contract in response to the conditions being fulfilled. Additionally, this allows the second user to indicate their position as holder of the blockchain agreement NFT to other users, with prior permission from the second user and/or the first user. Therefore, the second user may solicit other users to fulfill the conditions of the smart contract for a different value and/or according to different operations and/or different conditions. Alternatively, or additionally, the second user can submit a separate smart contract to the blockchain network, and the separate smart contract can indicate that a third user, who is selected to fulfill the separate smart contract, will receive at least a portion of some separate value amount in response to the conditions of the initial smart contract being fulfilled.

The method 300 can proceed from the operation 312, or the operation 310, to an operation 314, which can include determining whether the conditions for fulfilling the agricultural operation agreement (i.e., the smart contract) have been fulfilled. In some implementations, a data source can be designated as reliable for providing information that indicates whether the condition has been fulfilled. For example, the data source can be selected by a variety of different users of the blockchain network, as part of a vote. Alternatively, or additionally, the first user can designate one or more data sources as reliable for indicating whether the conditions have been fulfilled. The one or more data sources can then be identified by any blockchain network user that has an interest in submitting a bid and/or other input to the smart contract to be responsible for fulfilling the smart contract. In this way, if a prospective user does not agree with the particular data source, the prospective user can bypass providing a bid and/or input to that particular smart contract address.

In some implementations, determining whether the conditions have been fulfilled can include processing data using one or more heuristic processes and/or one or more trained machine learning models. For example, when the smart contract involves reducing nitrogen runoff and/or carbon sequestration, the conditions for the smart contract can be satisfied when a sensor and/or computing device at the parcel of land owned by the first user provides certain data to the blockchain agreement address. This certain data can include sensor data that characterizes an amount, and/or a change to an amount, of nitrogen runoff and/or an amount of carbon at the parcel of land. When the certain data satisfies a particular condition for the smart contract, the method 300 can proceed from the operation 314 to an optional operation 316 and/or the operation 302. When the certain data does not satisfy the particular condition for the smart contract, the method 300 can proceed from the operation 314 and optionally return to the operation 310 and/or another suitable operation.

The optional operation 316 can include causing blockchain data to be transferred from the blockchain agreement address, and/or the first blockchain address associated with the first user, to the second blockchain address associated with the second user. In some implementations, the blockchain data can characterize an amount of value that has been designated, by the smart contract, for one or more users that perform the agricultural operation(s) identified in the smart contract. Alternatively, or additionally, the blockchain data can include an NFT that the second user has earned for causing the one or more conditions of the smart contract to be fulfilled. The NFT can then be communicated to other users of the blockchain network according to conditions determined by the second user.

Figure 4:
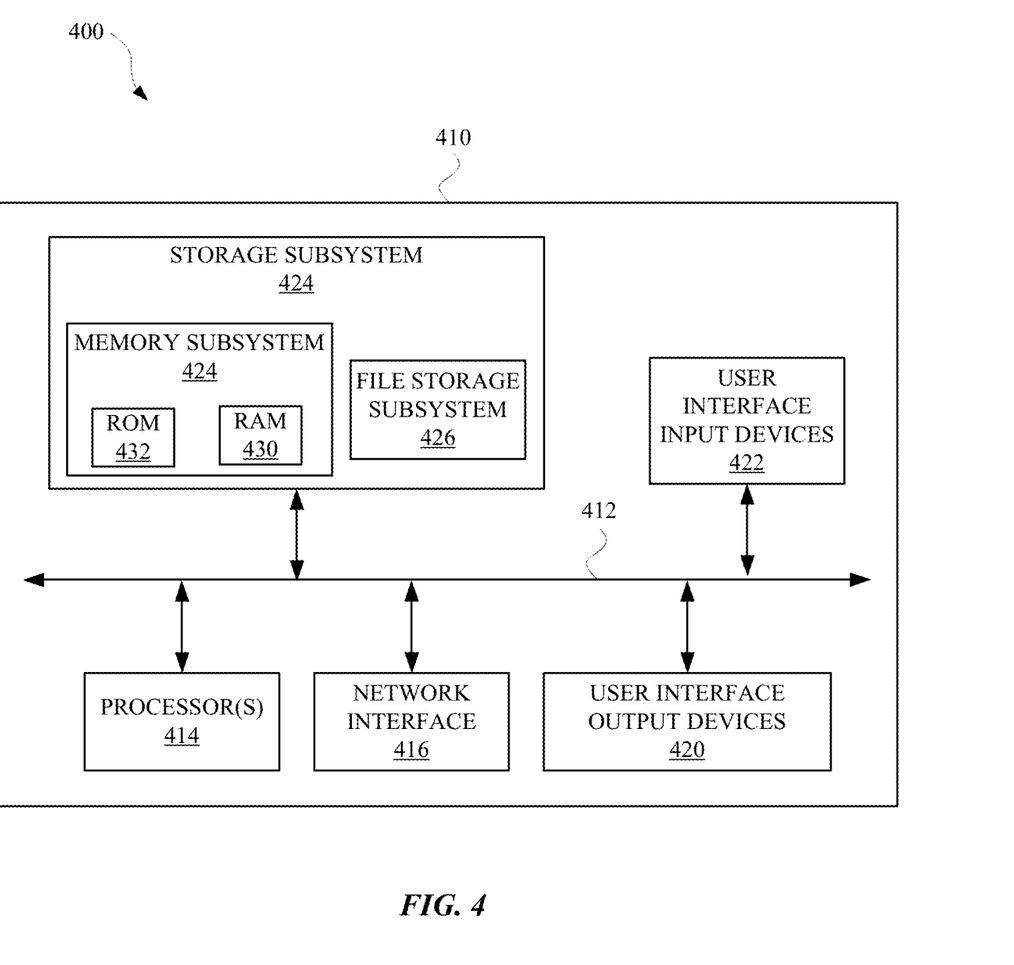
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 300, a blockchain network, a distributing computing network, a P2P network, computing device(s), and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
processing cell data that characterizes one or more bounding shapes that at least partially extend over a digital representation of parcels of land, wherein processing the cell data includes fractally dividing the one or more bounding shapes into a set of bounding shapes in which each bounding shape at least partially extends over a particular digital representation of a parcel of farmland, the parcel of farmland being owned by a user of a blockchain network;
determining, based on the processed cell data, cell values that characterize each bounding shape of the set of bounding shapes that at least partially extends over the digital representation of the parcel of farmland;
generating, based on the cell values, a land non-fungible token (NFT) that is stored at a blockchain user address corresponding to the user of the blockchain network, wherein the land NFT is stored in association with the cell values that characterize each bounding shape of the set of bounding shapes that at least partially extends over the digital representation of farmland;
determining that the user of the blockchain network has provided, to the blockchain network, blockchain agreement data that identifies a value to exchange for performing an agricultural operation at a portion of the parcel of farmland, and the blockchain agreement data is stored at a blockchain agreement address of the blockchain network with other cell values that correspond to a subset of the bounding shapes that at least partially extends over another digital representation of the portion of the parcel of farmland;

determining that an additional user of the blockchain network has caused an agreement input to be communicated from an additional blockchain user address to the blockchain agreement address, wherein the additional blockchain user address is stored on the blockchain network in association with the additional user; and after the agreement input is communicated from the additional blockchain user address to the blockchain agreement address, accessing sensor data that indicates the agricultural operation has been performed at the portion of the parcel of farmland, wherein the sensor data is generated at a first computing device that communicates with the blockchain network.

2. The method of claim 1, wherein the cell values correspond to S2 cell values.

3. The method of claim 1, wherein each bounding shape of the set of bounding shapes embodies one or more Hilbert curves, and a particular cell value of the cell values corresponds to a location on one or more of the Hilbert curves.

4. The method of claim 1, further comprising causing a notification to be rendered at an interface of a second computing device that is associated with the user, wherein the notification solicits the user to authenticate their ownership of the parcel of farmland, and wherein the land NFT is stored in association with the cell values in response to the user authenticating their ownership of the parcel of farmland.

5. The method of claim 1, further including, when the agricultural operation has been performed at the portion of the parcel of farmland, causing, based on determining that the agricultural operation has been performed, updated property data to be stored in association with the land NFT, and the value to be transferred from the blockchain agreement address, or the blockchain user address, to the additional blockchain user address, wherein the updated property data indicates a modification to the portion of the parcel of farmland resulting from the performance of the agricultural operation at the portion of the parcel of farmland.

6. A non-transitory computer readable storage medium storing instructions executable by one or more processors, wherein the instructions are to cause one or more processors to:

determine a cell value for a parcel of land that is associated with a first user of a blockchain network, wherein the cell value defines at least a boundary of the parcel of land, and the blockchain network is a peer-to-peer network of multiple different devices;

generate, based on the cell value, a land non-fungible token (NFT) that includes NFT data that correlates the cell value for the parcel of land to a first blockchain address on the blockchain network, wherein the land NFT is stored on one or more devices of the multiple different devices of the blockchain network, and the first blockchain address is stored in association with the first user;

determine, subsequent to generating the land NFT, that the first user has provided blockchain agreement data that identifies a value to exchange for satisfying a condition at the parcel of land, wherein satisfying the condition includes performing an agricultural operation at the parcel of land;

generate, based on the blockchain agreement data, a blockchain agreement address that is stored on the blockchain network in association with the land NFT, wherein the blockchain agreement data is stored at the blockchain agreement address and the blockchain agreement data is accessible to one or more other users of the blockchain network;

determine, subsequent to generating the blockchain agreement address, that a second user of the blockchain network has caused an agreement input to be transferred from a second blockchain address to the blockchain agreement address, wherein the second blockchain address is stored on the blockchain network in association with the second user;

cause, in response to the agreement input being transferred from the second blockchain address to the blockchain agreement address, an agreement NFT to be transferred from the blockchain agreement address to the second blockchain address for the second user, wherein the agreement NFT indicates that the second user has been selected to perform the agricultural operation at the parcel of land; and access, in response to the agreement input being communicated from the second blockchain address to the blockchain agreement address, sensor data that indicates the agricultural operation has been performed at the parcel of land, wherein the sensor data is generated at a computing device that communicates with the blockchain network.

7. The non-transitory computer readable storage medium of claim 6, wherein to determine the cell value for the parcel of land that is associated with the first user of the blockchain network causes the one or more processors to:

determine a parcel of land address for the first user; and
select, based on the parcel of land address, a single-dimensional value for the parcel of land from a finite range of values corresponding to various different portions of the parcel of land, wherein the cell value includes the single-dimensional value.

8. The non-transitory computer readable medium of claim 6, wherein to determine the cell value for the parcel of land that is associated with the first user of the blockchain network causes the one or more processors to:

determine a parcel of land address for the first user; and
select, based on the parcel of land address, an S2 cell value for the parcel of land, wherein the cell value includes the S2 cell value.

9. The method non-transitory computer readable storage medium of claim 6, wherein the agricultural operation includes adding an object to the parcel of land, removing another object from the parcel of land, and/or modifying a particular object at the parcel of land.

10. The non-transitory computer readable storage medium of claim 6, wherein, subsequent to the agreement NFT being transferred from the blockchain agreement address to the second blockchain address for the second user, the instructions cause one or more processors to determine whether a data source indicates that the condition identified by the blockchain agreement data has been satisfied.

11. The non-transitory computer readable medium of claim 10, wherein to determine whether the data source indicates that the condition identified by the blockchain agreement data has been satisfied causes the one or more processors to process image data using one or more trained machine learning models in furtherance of determining whether the agricultural operation has been performed at the parcel of land.

12. The non-transitory computer readable medium of claim 10, wherein the data source is the computing device that includes one or more sensors that are responsive to environmental changes at the parcel of land, and to determine whether the data source indicates that the condition identified by the blockchain agreement data has been satisfied includes to cause the one or more processors to receive, at the blockchain agreement address, environmental data that is based on sensor data generated using the one or more sensors of the computing device.

13. The non-transitory computer readable medium of claim 12, wherein the one or more sensors include a moisture sensor, a temperature sensor, an image sensor, and/or a weight sensor.

14. The method non-transitory computer readable medium of claim 6, wherein to determine the cell value for the parcel of land that is associated with the first user of the blockchain network causes the one or more processors to determine the cell value using an S2 cell that corresponds to a collection of parcels of land, wherein the collection of parcels of land includes the parcel of land and other parcels of land.

15. A method implemented by one or more processors, the method comprising:
   determining that a first user of a blockchain network has provided, to the blockchain network, blockchain agreement data that identifies a value to exchange for satisfying a condition at a parcel of land associated with the first user, wherein satisfying the condition includes performing an agricultural operation at the parcel of land, and wherein the parcel of land is characterized by a land NFT that is stored, by the blockchain network, at a first blockchain address associated with the first user;
   determining that a second user of the blockchain network has caused an agreement input to be communicated from a second blockchain address to a blockchain agreement address, wherein the second blockchain address is stored on the blockchain network in association with the second user, and the blockchain agreement address is stored on the blockchain network in association with the blockchain agreement data;
   accessing, in response to the agreement input being communicated from the second blockchain address to the blockchain agreement address, whether sensor data that indicates the agricultural operation has been performed at the parcel of land, wherein the sensor data is generated at a computing device that communicates with the blockchain network; and
   when the agricultural operation has been performed at the parcel of land to satisfy the condition identified by the blockchain agreement data, causing, based on determining that the condition is satisfied, updated property data to be stored in association with the land NFT, and the value to be transferred from the blockchain agreement address, or the first blockchain address, to the second blockchain address, wherein the updated property data indicates a modification to the parcel of land resulting from performance of the agricultural operation at the parcel of land.

16. The method of claim 15, wherein the sensor data includes image data, and the image data is processed using one or more trained machine learning models in furtherance of determining a pattern of movement of agricultural products and/or agricultural equipment at the parcel of land.

17. The method of claim 15, wherein the blockchain network is a peer-to-peer network and the land NFT is stored in association with S2 cell data that includes single-dimensional data for characterizing the parcel of land.

* * * * *